United States Patent [19]

Russo

[11] Patent Number: 4,673,323

[45] Date of Patent: Jun. 16, 1987

[54] SELF TAPPING STUD

[76] Inventor: Peter Russo, 719 Nut Plains Rd., Guilford, Conn. 06437

[21] Appl. No.: 848,939

[22] Filed: Apr. 7, 1986

[51] Int. Cl.⁴ ............................................. F16B 25/02
[52] U.S. Cl. ................................. 411/387; 10/141 R; 408/222; 411/418
[58] Field of Search .............. 411/386, 387, 389, 388, 411/417–422; 408/222; 10/141 R

[56] References Cited

U.S. PATENT DOCUMENTS

| | | | |
|---|---|---|---|
| 438,754 | 10/1890 | Rogers | 411/387 |
| 2,113,600 | 4/1938 | Olson | 411/386 |
| 2,156,350 | 5/1939 | Olson | 411/420 |
| 2,165,011 | 7/1939 | Rosenberg | 411/420 |
| 2,278,377 | 3/1942 | Cook | 411/387 |
| 2,278,411 | 4/1942 | Braendel | 411/386 |
| 2,871,751 | 2/1959 | Lemke | 411/387 |
| 2,956,470 | 10/1960 | Knohl | 411/387 |
| 3,056,234 | 10/1962 | Nelsson et al. | 411/386 X |
| 3,370,501 | 2/1968 | Ansingh | 411/387 |
| 3,965,793 | 6/1976 | Roser | 411/386 |

FOREIGN PATENT DOCUMENTS

| | | | |
|---|---|---|---|
| 2543960 | 4/1977 | Fed. Rep. of Germany | 411/387 |
| 3242926 | 5/1984 | Fed. Rep. of Germany | 411/417 |
| 491710 | 9/1938 | United Kingdom | 411/418 |

Primary Examiner—Robert L. Wolfe
Assistant Examiner—Lloyd A. Gall
Attorney, Agent, or Firm—Lawrence Hager

[57] ABSTRACT

A self-tapping and/or self-carving stud having two or more right angle elongate grooves of alternate length in the tapered thread or projecting helical ribs. The right angled grooves enable tapping debris to accumulate in the grooves to help lock the threads for fastening the stud, particularly in irregular holes. The alternate length of the grooves helps make this stud design unbreakable, thus unbeatable for special situations especially in exhaust manifold applications.

5 Claims, 6 Drawing Figures

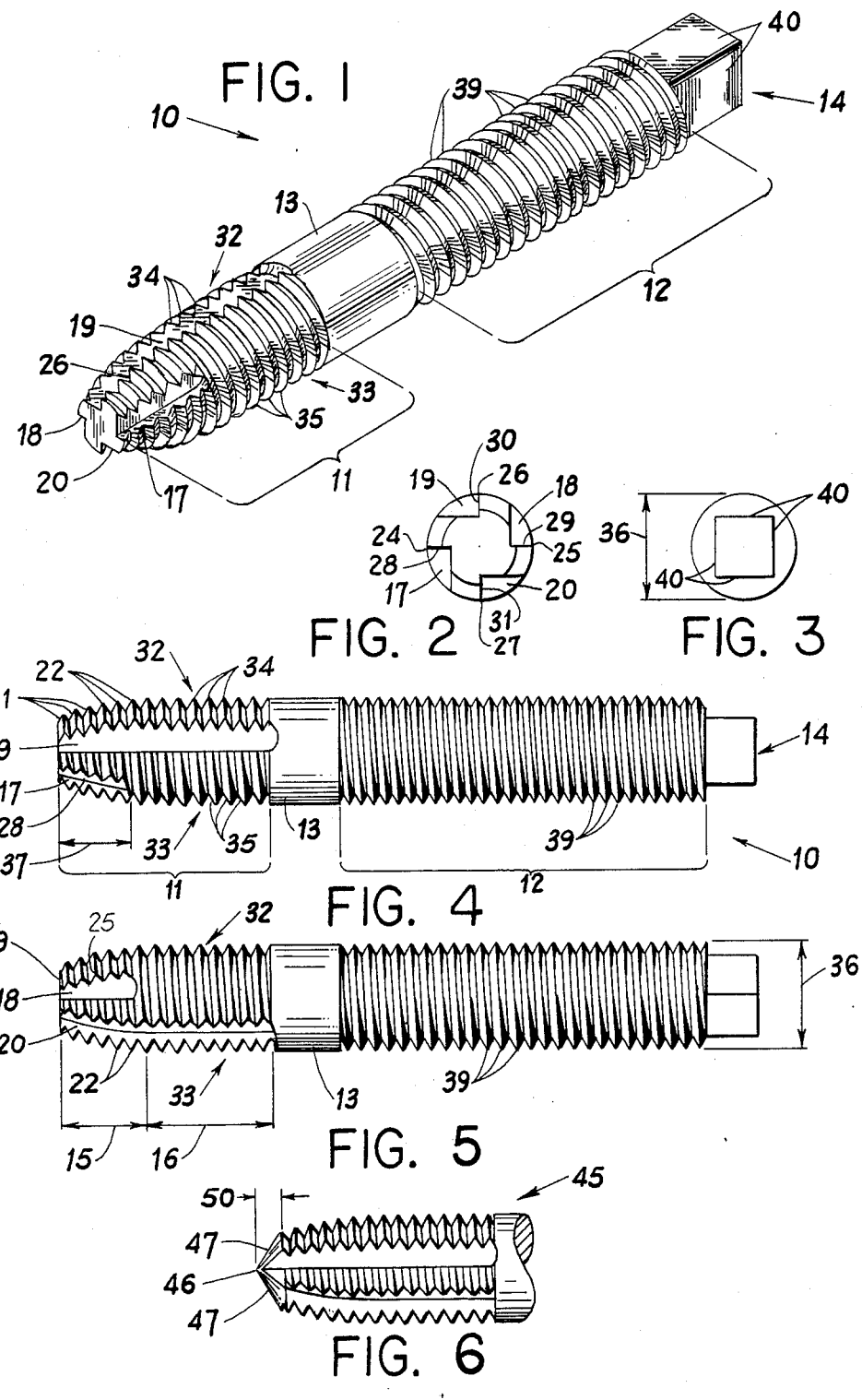

SELF TAPPING STUD

FIELD OF THE INVENTION

The present invention relates to a method and device for relatively simply replacing broken or installing new studs and, more particularly, to a new and improved self-tapping or self-carving stud like device.

BACKGROUND OF THE INVENTION

There are presently available so-called tap devices which are utilized in a pre-drilled hole of exact size to re-thread said hole. Typically, these prior art tap devices comprise an elongate bolt shape with a threaded portion that contains four spaced apart semicircular shaped cutouts each extending longitudinally the entire length of the threaded portion of the tap.

Some major disadvantages of these prior art type tap devices are: (1) they have a single purpose, i.e., to tap or thread and exact sized pre-drilled hole; (2) exhibit a tendency to break as a result of, for example, the four elongate cutouts; (3) subject to becoming dull or weakened with repeated use; (4) tendency to effect cross threading when use in a pre-existing threaded boring; (5) generally not suitable for use in irregular or rough or mutilated or undersized pre-drilled borings; (6) the tapped boring requires thorough cleaning to remove debris so that a bolt or stud can then be inserted into the tapped boring requiring extra time and expense; and (7) self-tap threads do not always easily bite or grab and initiate themselves into unthreaded holes and instead of pulling themselves into a hole of some particular size or with some kind of irregularity they resist "start" tapping procedure so crucial to successfully tapping threads, again requiring extra installation time and expense.

In contrast to the prior art, the present invention provides a dual function tap and stud device, enables multiple functions, is adapted for ease of use, substantially overcomes the disadvantages of the prior art noted above, generally enables quicker and improved thread cutting and may be used in some undersized boring holes. Some of the structural distinguishing feature of the present invention include a tapered tap thread portion, tap threads which are relatively sharp, two elongate "L" shaped grooves, two relatively shorter "L" shaped grooves extending a portion of the tapered tap portion and a threaded stud portion.

SUMMARY OF THE INVENTION

A dual function tap and stud device having particular utility for self-tapping or thread cutting a boring, for example, in a metal block and in particular the cast iron of an engine exhaust manifold, and for being utilized as a stud or bolt like part, comprising:

an elongate shaft having a threaded tap member (11) and a stud or bolt member (12), said tap member having a plurality of tapered threads (22) and a plurality of uniform threads (34,35), the threads of said tap member have a relatively sharp or pointed edge or thread ridge (24-27), said tap member includes a pair of spaced apart generally diametrically disposed somewhat "L" shaped grooves (19,20) which have a length substantially equal to the length of said tap member (11) and having a pair of spaced apart generally diametrically disposed somewhat "L" shaped grooves (17,18) having a length substantially equal to or slightly greater than the length of the tapered portion (15) of said tap member, and a stud or bolt member (12) having a plurality of threads (39).

OBJECTIVES

Accordingly, it is an object of the present invention to provide a new and improved stud device.

Another object of the present invention is to provide a new and improved tap device.

Another object of the present invention is to provide a dual function tap and stud device.

Another object of the present invention is to provide a tap device having a tapered tap thread.

Another object of the present invention is to provide a tap device having relatively sharp thread edges.

Another object of the present invention is to provide a tap device having a plurality of "L" shaped elongate grooves.

Another object of the present invention is to provide a self-tapping stud.

Another object of the present invention is to provide a thread cutting stud or self-carving stud.

Another object of the present invention is to provide a self-tapping stud which can be used in rough holes or borings not perfectly round or straight.

Another object of the present invention is to provide a self-tapping stud that can be used in undersized borings, with said self-tapping stud having tapered and sharp threads designed to enlarge the undersized boring and carve threads.

Another object of the present invention is to provide a self-tapping stud that can be used in solid metals, relatively hard metals such as cast iron and some kinds of steel and the like.

Another object of the present invention is to provide a self-tapping stud that can be inserted using a power tool such as an electric or pneumatic tool.

Another object of the present invention is to provide a self-tapping stud designed to utilize tapping debris to enhance securing or locking of a portion of the self-tapping stud threads and/or shaft in the boring.

BRIEF DESCRIPTION OF THE DRAWINGS

Other objects and advantages of the invention may be more clearly seen when viewed in conjunction with the accompanying drawings. Similar reference numerals refer to similar parts throughout.

FIG. 1 is a perspective view of a self-tappig stud in accordance with the invention;

FIG. 2 is an end view of the stud shown in FIG. 1;

FIG. 3 is another end view of the stud shown in FIG. 1;

FIG. 4 is a side view of the stud shown in FIG. 1;

FIG. 5 is another side view of the stud shown in FIG. 1; and

FIG. 6 is a partial side view of an alternative embodiment of a stud in accordance with the invention.

DESCRIPTION OF THE PREFERRED EMBODIMENTS

Referring to the drawings, there is shown a self-tapping stud 10 in accordance with the invention to have a robust configuration.

Applicant has successfully operated the inventive self-tapping stud 10 being formed from cold rolled steel with a heat treating of 0.015 case hardening, or other suitable material and hardness may be utilized.

Self-tapping stud 10 comprises a tap portion 11, a stud or bolt portion 12, an intermediate shank portion 13 and a head portion 14.

Tap portion 11 includes a tapered thread tip or end portion 15, a straight or none tapered thread portion 16, a first pair of diametrically disposed somewhat "L" shaped grooves 17 and 18, and a second pair of diametrically disposed somewhat "L" shaped grooves 19 and 20. The plurality of threads 21 about end portion 15 are tapered and have relatively sharp thread edges 22. Applicant has discovered that tapered and sharp threads 21 about portions of tap end or tip 15 effects or enhances alignment with any preexisting bore female threads (not shown) and thereby substantially prevents cross threading which is a frequent problem with use of a prior art tap (only) device (not shown). It should also be noted that, in accordance with the present invention, the relatively sharp thread edges 22 (as compared to flat or dull edges of prior art tap devices) facilitates and enables self-tapping stud 10 to cut more easily and establish new female threads (not shown) as these pointed threads will first bite, grab and pull themselves better into a bore hole (not shown) which prior thereto did not have such female threads. In this regard it is believed by applicant that the "L" shaped grooves 17,18,19 and 20 facilitate cutting of such female threads by the presentation of pointed cutting edges or thread tips 24,25,26 and 27 at the ends of the threads defining, in part, the bottom ledges 28,29,30 and 31 of grooves 17,18,19 and 20, respectively.

Tap portion 11 also includes a plurality of thread sections 32 and 33 having a plurality of sharp-edged threads 34 and 35, respectively, which define a circumference or thread diameter 36 approximately equal to or less than the diameter of intermediate shank portion 13. Accordingly, thread sections 32 and 33 and threads 34 and 35 are not tapered to define threads adapted for being mating received by female threads (not shown) within a bore hole, for example, in an automobile engine block or the like.

It should also be noted that tap portion with its tapered and non-tapered sharp and pointed thread edges 24–27 may be utilized to cut the boring wall to create the desired mating female threads therein.

The first pair of grooves 17 and 18 each longitudinally extend from tip 9 rearwards along a partial portion of tap portion 11. The length 37 of grooves 17 and 18 are approximately equal to or slightly longer than the length of tapered portion 15. It should also be recognized that grooves 17 and 18 may extend from tip 9 rearwards into a portion, for example, the first or second or several threads of the non-tapered thread sections 32 and 33 of tap section 16. Some purposes of partially extending grooves 17 and 18 along tap section 11 are VIS: to improve tap section 16 strength relative to prior art tap devices and to retain substantial thread 32 and 33 surfaces for engaging the boring female threads.

Said first pair of grooves 17 and 18 each have a length approximately equal to or greater than the length of the tapered end portion 15.

The second pair of grooves 19 and 20 extend generally from tip 9 rearwards approximately to or within a portion of intermediate shank portion 13.

Said second pair of grooves 19 and 20 each have a length approximately equal to or greater than the length of the tap member 11.

In this manner, a multi-purpose and multi-function self-tapping and/or self thread cutting, and stud-bolt member 11 is provided.

Stud end 14 contains a plurality of flat surfaces 40 dimensioned for being engaged by, for example, a wrench or power adaptor or socket wrench or the like to enable stud 10, i.e., tap/bolt section 11 to be driven into a bore hole in a metallic block or piece of metal etc.

In this manner, a dual function improved tap and stud is provided to obviate the need to first tap a hole using a discrete conventional tap device and next inserting a discrete stud device.

With reference now to FIG. 6, a cutaway perspective view of alternative embodiment of the self-tapping stud according to the present invention is shown. The self-tapping stud 45 is similar to the stud 10 shown in FIGS. 1–5, with the exception that a somewhat pointed end 46 and a plurality of blades or contoured/sloped tip surfaces 47 are provided at or project from the tip of stud 45. Pointed end 46 and blades 47 are integrally formed with stud 45. This alternative tip, referred to as debris removing antisnag tip, section 50 has been found to facilitate insertion and installation of stud 45 into an irregular shaped and/or a very dirty or debris filled bore hole (not shown) into which stud 45 is inserted and rotated. This tip design is intended to prevent resistance in such installation, just mentioned which otherwise could result in improper installation, damage or breakage of either or both stud or metal block component to which installation is being made. This design is more effective, durable and resistant to breakage during installation, than the prior art.

OPERATION

The general operation of self-tapping stud 10 (or 45) will now be discussed with reference to the drawings.

Let it be assumed that either an appropriately sized bore hole already exists or is drilled in a metal block which must be tapped to define suitable female threads.

The tapered tap end 15 is urged into the bore hole and stud 10 is rotated clockwise. As each tapered thread 21 engages an existing female bore hole thread, stud 10 threads are aligned therewith. This is facilitated due to the relatively sharp tap thread edges 22 which juxtaposition the threads of stud 10 between any existing female thread. It being recognized that the threads along tap section 11 are relatively sharp.

If the bore hole is slightly undersized, the tapered section 15 of tap member 11 provides increasing diameters cutting thread-teeth to cut a female thread within the undersized boring. Thus, each thread of larger diameter and, more particularly, each edge 24–27 of each section of tapered threads defined by grooves 17–20, cut deeper into the side wall of the boring until female threads are defined about the boring to accommodate the bolt like non-tapered threads along tap section 16.

As the thread tapping or cutting operation progresses, an amount of metal etc. debris is caused to develop. Applicant has discovered that in particular the shorter grooves 17,18 also serve the purpose of providing a space or pocket into which this debris is stored/deposited during the tapping/cutting action of self-tapping stud 10. In this manner, the present invention not only attempts to eliminate the need for cleaning a bore hole prior to inserting a new stud, but combines the operation of tapping and inserting a stud 10 into one single operation.

With reference to FIG. 6, the alternative self-tapping stud 45 with its pointed end 46 and blades 47 may be used in a bore hole having irregular contour or shape such as a mutilated hole or otherwise one having a substantial amount of debris therewith. The pointed tip 46 and blades 47 were discovered to facilitate and enable insertion of stud 45 without first cleaning the bore hole of such debris or irregularity.

While there has been shown what is considered to be the preferred embodiments of the invention, it is desired to secure in the appended claims all modifications as fall within the spirit and scope of the invention. For example, it is possible to substitute cold rolled steel with high speed steel and a different case hardening to better suit a special situation or application for installing self-tapping stud into a harder material etc., another modification could include the length of tapered portion 15 to be longer or shorter depending upon usage, thickness, or hardness of material etc.

I claim:

1. A dual function tap and stud device, comprising:

a tap member (11) having a tapered end portion (15) with a plurality a tapered tap threads (21), and having a uniform portion (16) with a plurality of uniform diameter tap threads (34, 35), a first pair of "L" shaped dimetrically spaced grooves (17, 18) each having a length approximately equal to the length of said tapered end portion, a second pair of "L" shaped diametrically spaced grooves (19, 20) each having a length approximately equal to the length of said tap member, said tapered tap threads each having a generally sharp thread portion (21) and a plurality of substantially pointed tapered tip cutting edges (24, 25, 26, 27), said uniform diameter tap threads each having a generally sharp thread portion (34, 35) and a plurality of uniform diameter and substantially pointed thread tip cutting edges;

an intermediate shank portion (13); and a stud member (12) having a third plurality of generally uniform threads (39).

2. A stud device as in claim 1, wherein:

the tap member being formed from cold rolled steel with a suitable case hardness.

3. A stud device as in claim 1, including:

a pair of blade means projecting outwardly from the free end of the tapered threaded portion of said tap member.

4. A stud device as in claim 1, including:

a head portion projecting from said stud member and having a plurality of flat surfaces.

5. A dual function tap and stud device, comprising:

a tap member (11) having a tapered end portion (15), and having a generally uniform portion (16), and having a plurality of tapered tap threads (21), and having a plurality of generally uniform tap threads (34, 35), and having a first pair of longitudinal substantially "L" shaped diametrically spaced grooves (17, 18) each having a length approximately equal to or greater than the length of said tapered end portion and substantially less than the length of said tap member, and having a second pair of longitudinal substantially "L" shaped diametrically spaced grooves (19, 20) each having a length approximately equal to or greater than the length of said tap member, said tapered tap threads each having four pointed tip cutting edges (24, 25, 26, 27), said uniform tap threads each having two pointed tip cutting edges;

an intermediate shank portion (13);

a stud member (12) having a third plurality of generally uniform threads (39); and a head member (14).

* * * * *